United States Patent
Hummel et al.

(10) Patent No.: US 6,497,459 B2
(45) Date of Patent: Dec. 24, 2002

(54) MULTI-PART VEHICLE WHEEL

(75) Inventors: Frank Hummel, Eningen (DE); Jens Stach, Heimsheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/809,436

(22) Filed: Mar. 16, 2001

(65) Prior Publication Data

US 2001/0033104 A1 Oct. 25, 2001

(30) Foreign Application Priority Data

Mar. 16, 2000 (DE) .......................... 100 12 890

(51) Int. Cl.[7] .............................. B60B 3/08
(52) U.S. Cl. .............. 301/64.101; 301/64.201
(58) Field of Search ............... 301/65, 63.106, 301/64.101, 64.201

(56) References Cited

U.S. PATENT DOCUMENTS

| | | | | |
|---|---|---|---|---|
| 1,163,360 A | * | 12/1915 | Moore | 301/64.101 |
| 1,180,064 A | * | 4/1916 | Murray | 301/65 |
| 1,602,512 A | * | 10/1926 | Walther et al. | 301/58 |
| 4,200,326 A | * | 4/1980 | Wilcox | 295/23 |
| 4,919,490 A | * | 4/1990 | Hopkins et al. | 301/104 |
| 5,452,945 A | * | 9/1995 | Schlanger | 301/104 |
| 5,538,329 A | * | 7/1996 | Stach | 29/894 |
| 6,024,415 A | * | 2/2000 | Stach | 301/63.107 |

FOREIGN PATENT DOCUMENTS

| | | | |
|---|---|---|---|
| DE | 4128391 A1 | | 3/1993 |
| DE | 4445267 A1 | | 6/1996 |
| DE | 1054958 A | * | 12/1997 |
| DE | 29723749 U1 | * | 1/1999 |
| DE | 197 54 959 A1 | | 6/1999 |
| DE | 19926575 A1 | | 12/2000 |
| JP | 2000280703 A | * | 3/1999 |

* cited by examiner

Primary Examiner—S. Joseph Morano
Assistant Examiner—Frantz F. Jules
(74) Attorney, Agent, or Firm—Crowell & Moring LLP

(57) ABSTRACT

A multi-part vehicle wheel includes a rim spider and a rim which are mutually connected by screwing devices. For connection by way of the screwing devices, the rim spider has ring surfaces which are placed flush on the rim. So that precise positioning of the metal foam core can take place, this metal foam core has core marks or needle cushions. For sealing off the hollow space of the spoke of the rim spider, which is filled with metal foam, a sealing strip or a sealing ring is arranged between the rim and the rim spider and is held in a clamped-in manner when the wheel parts are connected.

10 Claims, 3 Drawing Sheets

MULTI-PART VEHICLE WHEEL

This application claims the priority of German application 100 12 890.4, filed Mar. 16, 2000, the disclosure of which is expressly incorporated by reference herein.

BACKGROUND AND SUMMARY OF THE INVENTION

The present invention relates to a multi-part vehicle wheel for a motor vehicle including hollow spokes arranged in a rim spider between air openings. A core made of metal foam remains in the rim spider and is precisely positionable in a casting die tool, and a ring surface, provided on the rim spider, radially projects beyond an interior-side or exterior-side wall of the rim spider for connection with a rim.

German Patent Document DE 197 54 959 A1 relates to a one-piece wheel for a motor vehicle which has hollow spokes and ring ducts and in which a respective remaining core of metal foam is arranged. This metal foam core is used instead of a removable sand core during casting of the wheel in a casting die tool.

It is an object of the invention to provide a multi-part wheel for a motor vehicle in which positioning of a metal foam core remaining in hollow spaces of the wheel is to be ensured and in which an optimal sealing-off of this metal foam core against outside influences when the vehicle wheel is assembled is achieved.

According to the invention, this object is achieved by providing the ring surface on the rim spider at an outer edge of the rim spider such that it defines a radially outward-extending first ring surface which is situated opposite a second ring surface in a spaced manner. The second ring surface includes either a bent or a straight ring web, and at least one of the first and second ring surfaces is connected by screwing devices with the rim.

Precise positioning of a metal foam core in a casting die tool is achieved according to the invention by needle pins forming positioning devices projecting from the core or arranged in a distributed manner. After casting of the wheel, these positioning devices are integrated, that is cast, into the wheel wall. In this case, the positioning devices are cast into the wall of the hollow spaces. The metal foam core can therefore no longer change its position in the hollow space, the wheel spoke, or in a ring space of the wheel.

Arrangement of the metal foam core in the casting die tool can also take place by way of a core portion extending out of the hollow spokes in the area of either the wheel center or the wheel center opening. Arrangement of the metal foam core in the casting die tool can also take place by way of a core portion extending out of the hollow spoke in the area of a wheel bolt bore. After casting of the wheel has been completed, and this core portion has been cut off corresponding to requirements, the wheel bolt bore and the central wheel opening will be interconnected.

A vehicle wheel, produced in this manner by way of a metal foam core, can be constructed in several pieces. The rim spider, for example, can be cast separately from the rim in the casting die tool. The rim can also be produced by a different method such as rolling.

In a first embodiment according to the invention, the rim spider is provided with approximately parallel extending edge-side ring surfaces, between which the hollow spokes and air openings are arranged. At least one of these ring surfaces is connected with the rim in a flat manner by way of screwing devices. The rim is correspondingly constructed with angular surfaces for this purpose. On a face side, the inner ring surface abuts a rim bottom surface and can be connected with the rim, for example, in a substance-adhering manner.

According to another embodiment of the invention, the inner ring surface has a bent ring web which is placed in a flat manner against the bottom surface of the rim. As a result, a second screw connection surface with respect to the rim is advantageously achieved. The first screw connection surface is obtained by way of the outer ring surface.

The metal foam core and the hollow space are protected against outside influences by a sealing strip or a sealing ring arranged between the connection surfaces of the rim spider and the rim. Thus, when the two wheel pieces, such as the rim and the rim spider, are connected, the sealing strip is held in a clamped-in manner.

When the hollow spoke is not filled with metal foam, in each embodiment of the wheel, a sealing strip can also be interposed so that the hollow space is protected against outside influences.

Instead of having the opening, the hollow spoke can also be closed off by way of a wall which will then be supported on the bottom surface of the rim.

BRIEF DESCRIPTION OF THE DRAWINGS

Embodiments of the invention are illustrated in the drawings and will be described in detail.

DESCRIPTION OF THE PREFERRED EMBODIMENTS

A multi-part wheel 1 or 2 comprises a rim spider 3 or 4, respectively, as well as a rim 5. The wheel, spider and rim are connected with one another, for example, by at least one screwed connection. One metal foam core, designated M, is arranged in the hollow spokes H or in ring spaces of the wheel 1 or 2.

Figure 1:
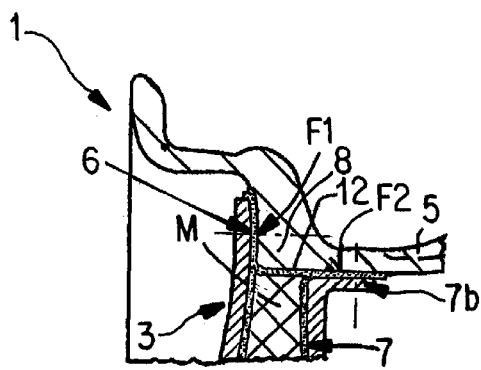
FIG. 1 is a view of a first embodiment of a wheel with a radial first ring surface, a spaced bent second ring surface, and a metal foam core.

According to a first embodiment which is shown in FIG. 1, the rim spider 3 is provided with an outer, radially extending first ring surface 6 which is situated opposite a spaced second ring surface having a bent web surface 7b. These two ring surfaces 6 and 7, 7b enclose an approximately right angle, in which a correspondingly constructed rim edge 8 is arranged. A connection of the ring surfaces 6, 7, 7b with surfaces F1 and F2 of the rim edge 8 takes place by way of screws which are arranged in a uniformly distributed manner along the circumference of the wheel 1.

Figure 2:
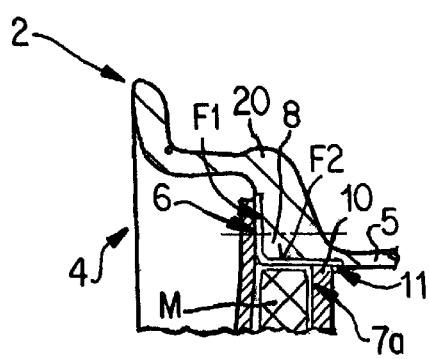
FIG. 2 is a view of a second embodiment of a wheel having a radial first ring surface, a spaced second radial ring surface, and a metal foam core.

According to another embodiment which is shown in FIG. 2, the outer ring surface 6 extends in the same way as in the embodiment of FIG. 1. An inner ring surface 7a, however, extends, radially toward the outside, without any bend 7b. Together with the front edge 10 of the ring surface 7a, the outer ring surface 6 forms an angular receiving device for the rim edge 8. A screwed connection takes place only by way of the ring surface 6 on the surface F1, and the front edge 10 of the ring surface 7a abuts the surface F2 from below or is arranged exposed to the latter.

Figure 3:
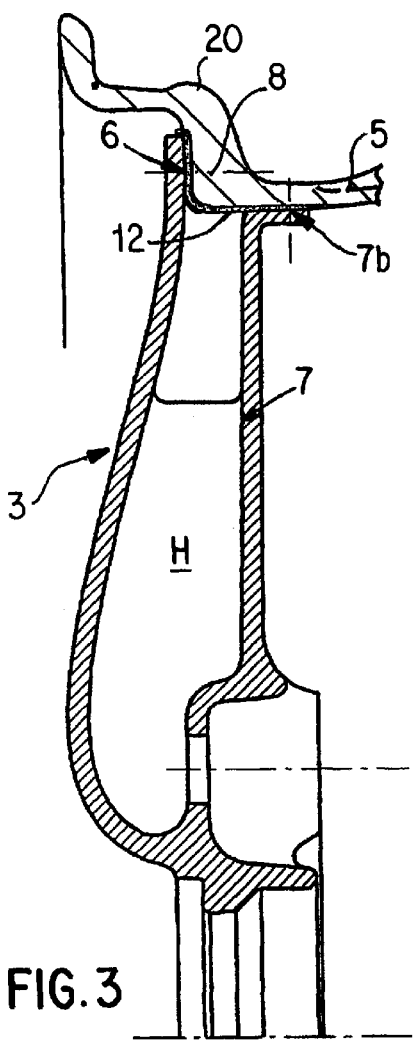
FIGS. 3 and 4 are views of embodiments according to FIGS. 1 and 2 without metal foam cores.
Figure 4:
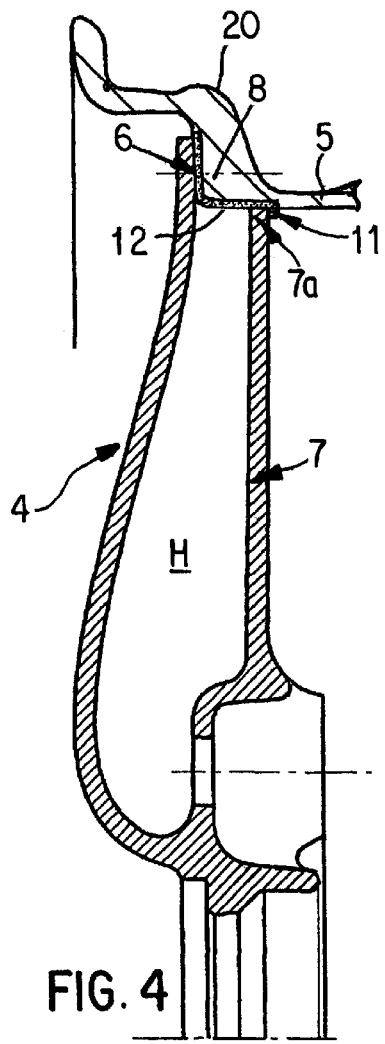

FIGS. 3 and 4 show wheels which have a construction of the rim spider 3, 4 according to FIGS. 1 and 2. The wheels shown in FIGS. 3 and 4, however, have no metal foam cores and are cast in conventional manners with sand cores in casting die tools which are removed after casting. For this purpose, additional openings can be provided on the lower ends of the hollow spokes H.

According to another embodiment, the hollow spokes H can also be closed off by way of a wall W which is supported on a surface F2 of the rim 5. This can be provided as an alternative for all embodiments of the rim spider 5 and is illustrated, for example, in FIG. 5 by broken lines.

A sealing strip 12 is interposed in the area of the surfaces F1, F2, which are disposed upon one another, with the ring surfaces 6 and 7, 7b as well as 6 and 7a of the rim spider 3, 4. When the rim spider 3 and the rim 5 as well as the rim spider 4 and the rim 5 are connected, this sealing strip 12 is held so as to be clamped between these pieces. The sealing strip 12 may have a sealing ring 11 on the exterior side.

Figure 5:
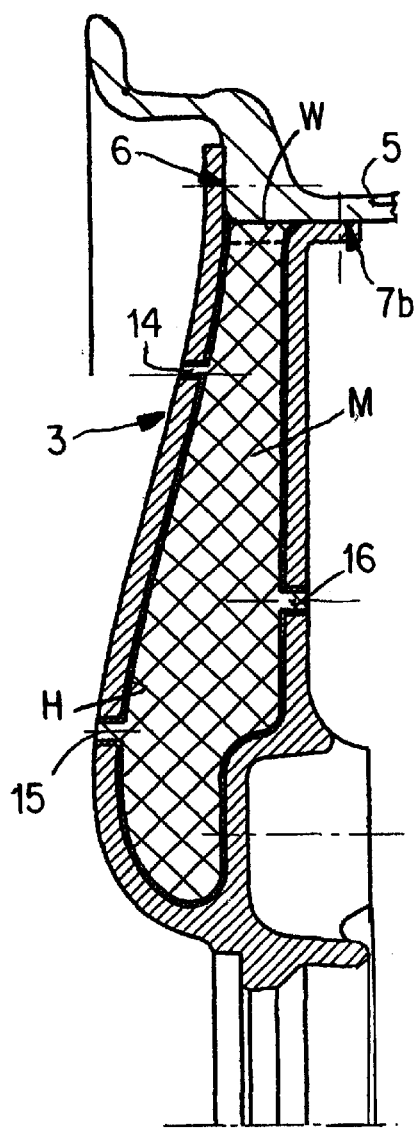
FIG. 5 is a view of an embodiment of the metal foam core with corresponding core marks for the wheel according to FIG. 2.
Figure 6:
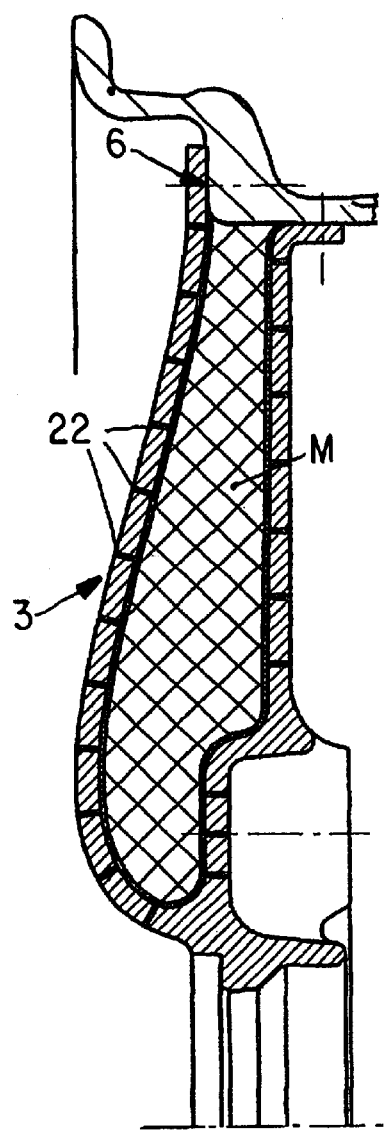
FIG. 6 is a view of an embodiment of the metal foam core having needles as corresponding core marks for the wheel according to FIG. 2.

FIGS. 5 and 6 illustrate two possibilities for positioning the metal foam core 5 in the casting die tool. In FIG. 5, positioning takes place by way of so-called core marks 14, 15, 16 which, projecting from the core of the rim spider 3, 4 and after the casting operation, are integrated in the wall of the rim spider 3, 4.

In FIG. 6, so-called needles are arranged in a distributed manner on the circumference of the metal foam core M of the rim spider 3, 4. This ensures a very precise positioning and fixing in the wall of the rim spider 3, 4.

Figure 7:
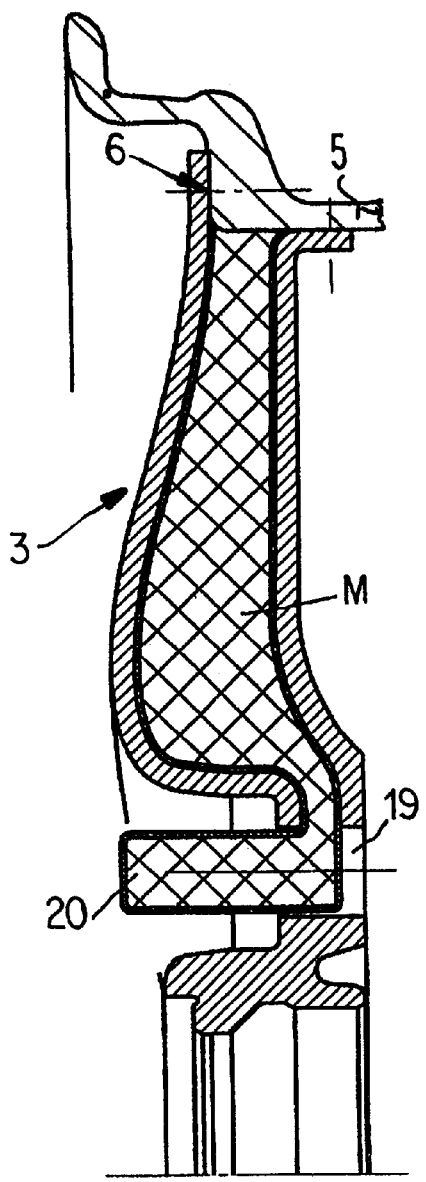
FIGS. 7 and 8 are views of metal foam cores in a casting die tool.
Figure 8:
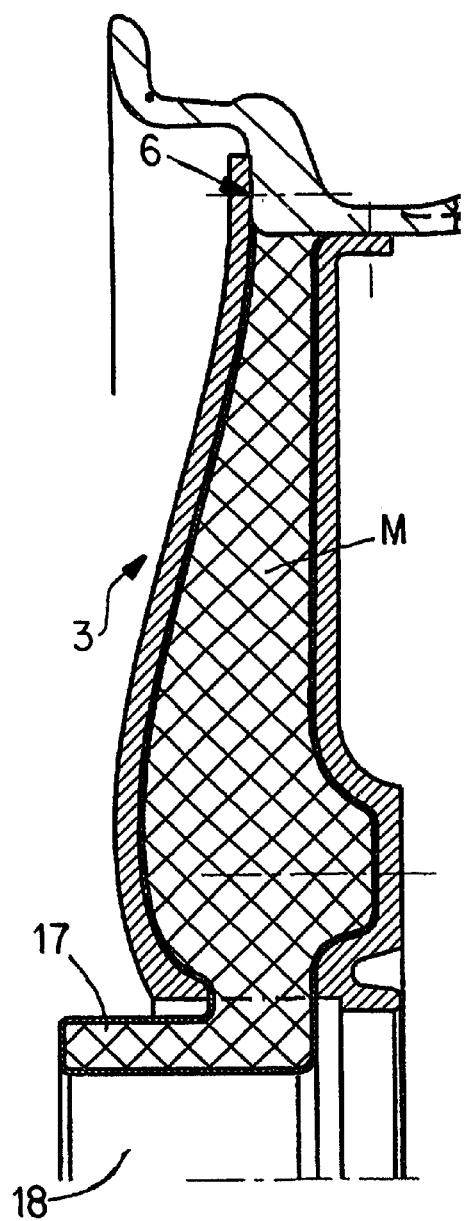

FIGS. 7 and 8 illustrate additional arranging possibilities of they metal foam core M in the casting die tool. Thus, FIG. 7 shows a projection 20 of the core M which extends out of a bore 19 for a fastening bolt. In FIG. 8, another projection 17 extends through the central opening 18 of the wheel for the support in the casting die tool.

In FIGS. 7 and 8, this arranging possibility is illustrated on the embodiments of the rim spider 3. An identical arrangement can take place on the rim spider 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A multi-part wheel for a motor vehicle comprising hollow spokes arranged in a rim spider between air openings, a remaining core made of metal foam in the rim spider, the remaining core being precisely positionable in a casting die tool, and a ring surface provided on the rim spider which radially projects beyond a side wall of the rim spider for connection with a wheel rim, wherein the ring surface provided on the rim spider is provided on an outer edge of the rim spider and defines a radially outward-extending first ring surface which is situated opposite a second ring surface in a spaced manner, wherein the second ring surface comprises a ring web, wherein at least one of the first and second ring surfaces is connected by screwing devices with the rim, and wherein each of the hollow spokes of the rim spider has an opening to the metal foam core in the direction of the rim, each opening being closed off by way of at least one sealing element which is arranged between the surfaces of the rim and a corresponding angular surface of the rim spider, and wherein the at least one sealing element, by way of the connection of the at least one of the first and second ring surfaces, is held clamped in between the rim spider and the rim.

2. The multi-part wheel according to claim 1, wherein the sealing element is a surrounding sealing strip with an interior-side sealing ring.

3. The multi-part wheel according to claim 1, wherein the metal foam core is fixed in the wall of at least one of the hollow spokes by way of core marks arranged in a distributed manner on a circumferential surface of the core.

4. The multi-part wheel according to claim 2, wherein the metal foam core is fixed in the wall of at least one of the hollow spokes by way of core marks arranged in a distributed manner on a circumferential surface of the core.

5. A multi-part wheel for a motor vehicle comprising hollow spokes arranged in a rim spider between air openings, a remaining core made of metal foam in the rim spider, the remaining core being precisely positionable in a casting die tool, and a ring surface provided on the rim spider which radially projects beyond a side wall of the rim spider for connection with a wheel rim, wherein the ring surface provided on the rim spider is provided on an outer edge of the rim spider and defines a radially outward-extending first ring surface which is situated opposite a second ring surface in a spaced manner, wherein the second ring surface comprises a ring web, wherein at least one of the first and second ring surfaces is connected by screwing devices with the rim, and wherein the metal foam core is fixed in the wall of at least one of the hollow spokes by way of core marks arranged in a distributed manner on a circumferential surface of the core.

6. A multi-part wheel for a motor vehicle comprising hollow spokes arranged in a rim spider between air openings, a remaining core made of metal foam in the rim spider, the remaining core being precisely positionable in a casting die tool, and a ring surface provided on the rim spider which radially projects beyond a side wall of the rim spider for connection with a wheel rim, wherein the ring surface provided on the rim spider is provided on an outer edge of the rim spider and defines a radially outward-extending first ring surface which is situated opposite a second ring surface in a spaced manner, wherein the second ring surface comprises a ring web, wherein at least one of the first and second ring surfaces is connected by screwing devices with the rim, wherein the rim has a double connection with the rim spider such that one connection takes place with the first ring surface and another connection takes place with the second ring surface comprising the bent ring web, the rim having an angular ring edge with surfaces situated opposite a hump, the surfaces being correspondingly arranged to provide the double connection with the ring surfaces of the rim spider, wherein each of the hollow spokes of the rim spider has an opening to the metal foam core in the direction of the rim, each opening being closed off by way of at least one sealing element which is arranged between the surfaces of the rim and a corresponding angular surface of the rim spider, and wherein the at least one sealing element, by way of the connection of the at least one of the first and second ring surfaces, is held clamped in between the rim spider and the rim.

7. The multi-part wheel according to claim 6, wherein the sealing element is a surrounding sealing strip with an interior-side sealing ring.

8. The multi-part wheel according to claim 7, wherein the metal foam core is fixed in the wall of at least one of the hollow spokes by way of core marks arranged in a distributed manner on a circumferential surface of the core.

9. A multi-part wheel for a motor vehicle comprising hollow spokes arranged in a rim spider between air openings, a remaining core made of metal foam in the rim spider, the remaining core being precisely positionable in a casting die tool, and a ring surface provided on the rim spider which radially projects beyond a side wall of the rim spider for connection with a wheel rim, wherein the ring surface provided on the rim spider is provided on an outer edge of the rim spider and defines a radially outward-extending first ring surface which is situated opposite a second ring surface in a spaced manner, wherein the second ring surface comprises a ring web, wherein at least one of the first and second ring surfaces is connected by screwing devices with the rim, wherein the rim has a double connection with the rim spider such that one connection takes place with the first ring surface and another connection takes place with the second ring surface comprising the bent ring web, the rim having an angular ring edge with surfaces situated opposite a hump, the surfaces being correspondingly arranged to provide the double connection with the ring surfaces of the rim spider, and wherein the metal foam core is fixed in the wall of at least one of the hollow spokes by way of core marks arranged in a distributed manner on a circumferential surface of the core.

10. A multi-part wheel for a motor vehicle comprising hollow spokes arranged in a rim spider between air openings, a remaining core made of metal foam in the rim spider, the remaining core being precisely positionable in a casting die tool, and a ring surface provided on the rim spider which radially projects beyond a side wall of the rim spider for connection with a wheel rim, wherein the ring surface provided on the rim spider is provided on an outer edge of the rim spider and defines a radially outward-extending first ring surface which is situated opposite a second ring surface in a spaced manner, wherein the second ring surface comprises a ring web, wherein at least one of the first and second ring surfaces is connected by screwing devices with the rim, wherein the rim has a double connection with the rim spider such that one connection takes place with the first ring surface and another connection takes place with the second ring surface comprising the bent ring web, the rim having an angular ring edge with surfaces situated opposite a hump, the surfaces being correspondingly arranged to provide the double connection with the ring surfaces of the rim spider, wherein each hollow spoke, between the ring surfaces, is closed off by way of a wall which rests against one surface of the angular ring edge of the rim, and wherein the metal foam core is fixed in the wall of at least one of the hollow spokes by way of core marks arranged in a distributed manner on a circumferential surface of the core.

* * * * *